United States Patent
Zirwas (10) Patent No.: US 10,128,992 B2
(45) Date of Patent: Nov. 13, 2018

(54) APPARATUS AND METHOD FOR COMMUNICATION WITH TIME-SHIFTED SUBBANDS

(71) Applicant: Nokia Solutions and Networks Oy, Espoo (FI)

(72) Inventor: Wolfgang Zirwas, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 52 days.

(21) Appl. No.: 15/037,967

(22) PCT Filed: Nov. 25, 2013

(86) PCT No.: PCT/EP2013/074535
§ 371 (c)(1),
(2) Date: May 19, 2016

(87) PCT Pub. No.: WO2015/074719
PCT Pub. Date: May 28, 2015

(65) Prior Publication Data
US 2016/0294516 A1    Oct. 6, 2016

(51) Int. Cl.
*H04L 5/00* (2006.01)
*H04L 5/14* (2006.01)
*H04L 27/26* (2006.01)

(52) U.S. Cl.
CPC .......... *H04L 5/0007* (2013.01); *H04L 5/0005* (2013.01); *H04L 5/14* (2013.01); *H04L 27/2633* (2013.01); *H04L 5/001* (2013.01); *H04L 5/0041* (2013.01); *H04L 5/0042* (2013.01); *H04L 27/2647* (2013.01)

(58) Field of Classification Search
None
See application file for complete search history.

(56) References Cited

U.S. PATENT DOCUMENTS

| | | | |
|---|---|---|---|
| 2011/0103506 A1* | 5/2011 | Moon | H04L 5/0023 375/267 |
| 2012/0063302 A1* | 3/2012 | Damnjanovic | H04W 74/0833 370/228 |
| 2012/0269136 A1 | 10/2012 | Seo et al. | |
| 2016/0087740 A1* | 3/2016 | Yu | H04B 10/5563 398/76 |

FOREIGN PATENT DOCUMENTS

| | | |
|---|---|---|
| CN | 101378378 A | 3/2009 |
| CN | 101816191 A | 8/2010 |

(Continued)

OTHER PUBLICATIONS

International Search Report received for corresponding Patent Cooperation Treaty Application No. PCT/CN2010/076876, dated Sep. 5, 2014, 5 pages.

(Continued)

*Primary Examiner* — Joseph A Bednash
(74) *Attorney, Agent, or Firm* — Harrington & Smith (57) ABSTRACT

Apparatuses and methods in a communication system are provided. The solution comprises utilizing a given number of parallel subbands in communication, where the transmission timing in each of the subbands is time-shifted by a predetermined time offset.

14 Claims, 3 Drawing Sheets

(56) References Cited

FOREIGN PATENT DOCUMENTS

| GB | 2487450 | 7/2012 |
|----|---------|--------|
| WO | 2010/077118 | 7/2010 |
| WO | 2011/099421 | 8/2011 |
| WO | 2012/135992 | 10/2012 |

OTHER PUBLICATIONS

IEEE Std 802.11™-2012—Telecommunications and information exchange between systems Local and metropolitan area networks—Specific requirements, "Part 11: Wireless LAN Medium Access Control (MAC) and Physical Layer (PHY) Specifications", New York, USA, Mar. 29, 2012, pp. 1593-1594.

\* cited by examiner

APPARATUS AND METHOD FOR COMMUNICATION WITH TIME-SHIFTED SUBBANDS

RELATED APPLICATION

This application was originally filed as PCT Application No. PCT/EP2013/074535 filed Nov. 25, 2013.

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE). An improved version of the Long Term Evolution radio access system is called LTE-Advanced (LTE-A). The LTE and LTE-A are designed to support various services, such as high-speed data. Another developed system is so called Beyond 4G (B4G) or 5G radio system which is assumed to be operational in the future.

In future, mobile broadband traffic is expected to increase significantly. A need for systems supporting very high data rates is clear. The design of high data rate communication faces many problems. One of the problems is latency which is due to properties of the system and processing delays in transceivers, for example.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising at least one processor; and at least one memory including computer program code, the at least one memory and the computer program code configured to, with the at least one processor, cause the apparatus at least to: utilise a given number of parallel subbands in communication, where the transmission timing in each of the carriers is time-shifted by a predetermined time offset.

According to an aspect of the present invention, there is provided an apparatus, comprising at least one processor; and at least one memory including computer program code, the at least one memory and the computer program code configured to, with the at least one processor, cause the apparatus at least to: transmit a message to a base station of a communication system; receive a response to the message on one of a given number of parallel subbands, where the transmission timing in each of the subbands is time-shifted by a predetermined time offset.

According to an aspect of the present invention, there is provided a method, comprising utilising a given number of parallel subbands in communication, where the transmission timing in each of the subbands is time-shifted by a predetermined time offset.

According to an aspect of the present invention, there is provided a method, comprising transmitting a message to a base station of a communication system; receiving a response to the message on one of a given number of parallel subbands, where the transmission timing in each of the subbands is time-shifted by a predetermined time offset.

LIST OF DRAWINGS

Embodiments of the present invention are described below, by way of example only, with reference to the accompanying drawings, in which.

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments of present invention are applicable to any network element, node, base station, relay node, server, corresponding component, and/or to any communication system or any combination of different communication systems that support required functionalities. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Many different radio protocols to be used in communications systems exist. Some examples of different communication systems are the universal mobile telecommunications system (UMTS) radio access network (UTRAN), HSPA (High Speed Packet Access), long term evolution (LTE®, known also as evolved UMTS Terrestrial Radio Access Network E-UTRAN), long term evolution advanced (LTE-A), Wireless Local Area Network (WLAN) based on IEEE 802.11 standard, worldwide interoperability for microwave access (WiMAX®), Bluetooth®, personal communications services (PCS) and systems using ultra-wideband (UWB) technology. IEEE refers to the Institute of Electrical and Electronics Engineers. For example, LTE® and LTE-A are developed by the Third Generation Partnership Project 3GPP.

Figure 1:
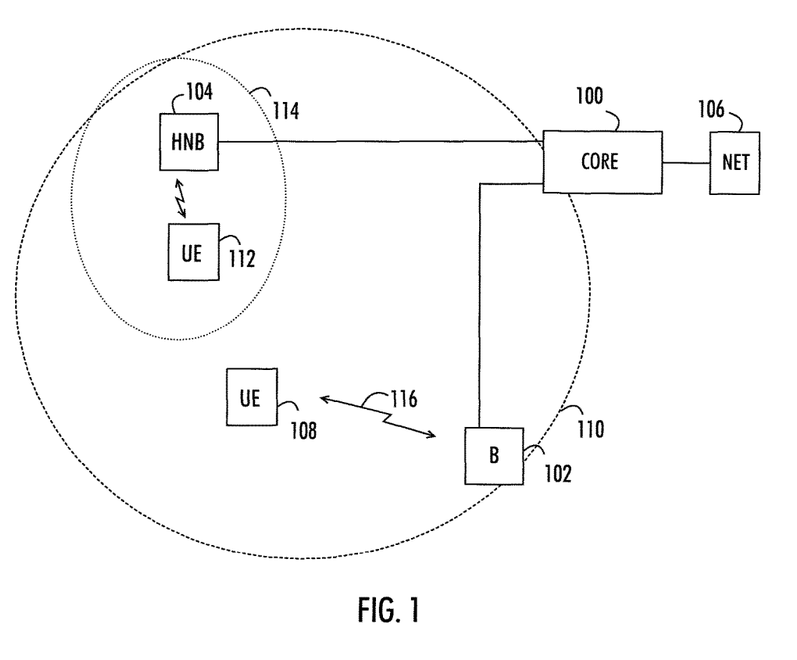
FIG. 1 illustrates an example of a communication environment.

With reference to FIG. 1, let us examine an example of a radio system to which embodiments of the invention can be applied.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here. The system discussed in following is based on LTE-A but the invention is not limited specifically to LTE-A based systems as one skilled in the art is well aware.

The exemplary radio system of FIG. 1 comprises a service core 100 of an operator.

In an embodiment, base stations that may also be called eNodeBs (Enhanced node Bs) 102, 104 of the radio system may host the functions for Radio Resource Management: Radio Bearer Control, Radio Admission Control, Connection Mobility Control, Dynamic Resource Allocation (scheduling). The core network 100 is configured to act as a gateway between the network and other parts of communication network such as the Internet 106, for example.

FIG. 1 illustrates user equipment UE 108 located in the service area 110 of the eNodeB 100 and UE 112 located in the service area 114 of the eNodeB 104. User equipment refers to a portable computing device. Such computing devices include wireless mobile communication devices, including, but not limited to, the following types of devices: mobile phone, smartphone, personal digital assistant (PDA), handset, laptop computer. The apparatus may be battery powered. The network may comprise base stations with service areas of different sizes and properties. In the example of FIG. 1, the base station 102 servers a large coverage area and the base station 104 is serving a micro or pico cell. Embodiments of the invention are not limited to any particular cell size or cell type.

In the example situation of FIG. 1, the user equipment 108 has a connection 116 with the eNodeB 102. The connection 116 may be a bidirectional connection related to a speech call or a data service such as browsing the Internet 106.

FIG. 1 only illustrates a simplified example. In practice, the network may include more base stations and more cells may be formed by the base stations. The networks of two or more operators may overlap, the sizes and form of the cells may vary from what is depicted in FIG. 1, etc.

The embodiments are not restricted to the network given above as an example, but a person skilled in the art may apply the solution to other communication networks provided with the necessary properties. For example, the connections between different network elements may be realized with Internet Protocol (IP) connections.

In the communication systems under development, low latency is identified as one of the relevant parameters to be able to serve high data rates. Low latency may also be needed in some applications such as car to car communication, for example. Latency on the air interface is typically related to the numerology of the system. For example, for LTE with a subframe length of 1 ms typical round trip times are in the range of 10 to 20 ms. This relatively high latency—compared to desired latencies of 1 to few ms for 5G—is a combination of the subframe length, the processing at the transmitting and receiving sides and the scheduler of the system, for example. The scheduler has to find suitable uplink and downlink transmission opportunities and has to send grant messages in advance, which might take a number of subframes.

One obvious solution is to change the numerology of the communication, i.e. to reduce the subframe length. The processing time can be reduced by using a 10 times shorter subframe length and which may lead to lowering the latency by a factor of 10. However, for orthogonal frequency-division multiplexing (OFDM) systems which is being used in LTE and which is the main candidate for 5G for the time being the reduced subframe length will have to be paid either by a much higher overhead for the guard interval or alternatively by an according shorter guard interval length.

The required length of the guard interval is dictated by the physical channel conditions—i.e. the time delay of the longest relevant multipath component. Therefore a shortened guard interval leads directly to a restriction in the possible scenarios in which UEs can be served, i.e. to typical local area (LA) scenarios like indoor or small cells. But, one should note that even indoor scenarios might experience extremely long multipath delays due to multiple reflections. In such cases the solution with the shortened guard interval will fail.

In an embodiment, the apparatuses of the communication system are configured to utilise a given number of parallel carriers in communication, where the transmission timing in each of the carriers is time-shifted by a predetermined time offset. If OFDM is utilised in communication, the predetermined time offset may be selected as a predetermined fraction of the OFDM symbol length used in the communication. In an embodiment, the numerology of the communications system related to subframe length is kept the same as in the current LTE system, i.e. 1 ms. The predetermined time offset may be a fifth of the OFDM symbol length (0.2 ms), for example. This numerical value is merely a non-limiting example. The fraction or the predetermined value may as well have a different numerical value.

It may be noted that embodiments of the invention are not limited to systems employing OFDM but it may be applied to other systems utilising subcarriers. The subcarriers or subband widths may be realised with polyphase filters or other type of filter banks, as only some examples. For example, each subfilter of a filter bank may utilise a different time-shift.

Figure 2:
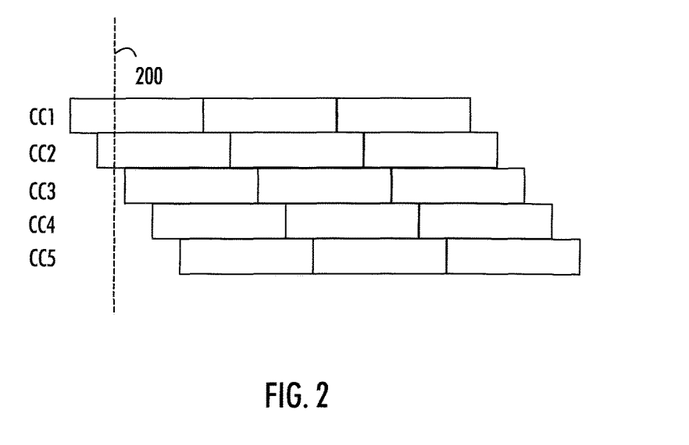
FIG. 2 illustrates an example of a set of parallel carriers.

FIG. 2 illustrates an example. The figure shows a set of parallel carriers CC1, CC2, CC3, CC4, CC5. Each carrier has a different time-shifted transmission start time. CC2 is shifted in comparison to CC1, CC3 is shifted in comparison to CC2 and so on.

In an example situation, a base station or eNodeB receives a packet from UE. The packet arrives at time instant 200. The base station is configured to select for the transmission of a response the parallel carrier that has the next possible transmission start time, i.e. CC3 and transmit a response to the message utilising the selected carrier.

In some embodiments, the parallel carriers are utilised in downlink communication, i.e. from base station or eNodeB to user equipment. In these embodiments, each UE has to be able to either receive on all component carriers (CC) in parallel or to switch between component carriers in a fast way.

In the example of FIG. 2, five parallel carriers are utilised, where each carrier is time-shifted a given predetermined time offset compared to neighboring carrier. In the example of FIG. 5 the offset may be a fifth of the OFDM symbol length. As time critical data for a certain UE is now sent over the CC (CC3), which has the next starting time after packet arrival, the maximum latency at the transmitter side can be reduced from 1 ms (LTE) to 0.2 ms.

The eNodeN may beforehand transmit information on the parallel carriers and the time-shifts of the carriers so that the UEs are able to synchronise quickly to the subcarriers.

For frequency division duplex (FDD), the same solution may be used for up- and downlink. As for FDD uplink and downlink is always available there might be even benefits compared to the Beyond 4G LA time division duplex (TDD) solution, where UEs have to wait till the end of a DL transmission before being allowed to transmit in UL.

Figure 3:
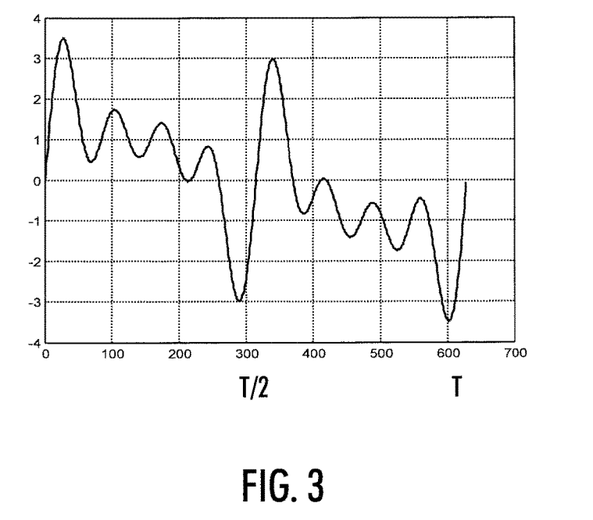
FIG. 3 illustrates an example of the time domain signal for an OFDM symbol where every other subcarrier is set to zero.

In general, in OFDM systems the receivers have to wait for full reception of an OFDM symbol, i.e. for 1 ms in case of LTE, before demodulation and decoding of a certain physical resource block (PRB) will be possible. In an embodiment, it is proposed to use a specific OFDM symbol subcarrier allocation, where only every other subcarrier is used for data transmission. For example, only even subcarriers may be used and odd carries left unused. The usage of every other subcarrier leads to a symmetric time domain signal. This is illustrated in FIG. 3. The figure illustrates the time domain signal for an OFDM symbol where every odd subcarrier is set to zero. This leads to a replication of the signal shape for the first part from time 0 to T/2 in the second part from T/2 to T, where T is symbol length. The benefit of this embodiment is that the symbol can be processed already after half of the symbol length with a FFT (Fast Fourier Transform) of half of the size. That way demodulation delay is halved as well. This may require an according adaptation of the coding to the overall shortened packet length.

'Short' OFDM symbols (OFDM symbols using only every other subcarriers for data signals) are a trade-off between fast decoding and throughput or capacity. Therefore this solutions works well when there is only a very limited number of data packets with such stringent delay requirements, which is reasonable in most scenarios. Typical power users watching video or loading emails are typically not having delay requirements in the ms-range. Really time critical data packets might be ACK/NACK messages, time sensitive applications like car to car communication warning messages etc., which are typically of small size.

By using only every fourth subcarrier of the OFDM symbol the delay might be even reduced by a factor of four, but obviously this has to be paid by an accordingly reduced usage of resources. This might be partly compensated by a 3 dB larger Tx power on the remaining subcarriers in the case of using every other subcarrier (or 6 dB for every fourth subcarrier usage), but at the same time the Rx power is reduced due to the shortened symbol length.

When cells are only partly loaded the 'short' OFDM symbols can be seen as better way of using the available resources.

In general, when a set of subcarriers are reserved for communication, every nth subcarrier may be utilised in communication, where n is an even positive integer. Respectively, a transmission power applied on the subcarriers may be (n−1) times the power used on an equivalent system utilizing all subcarriers in communication. The transmission power may also be lower or larger depending on interference issues or intended signal-to-noise ration.

In case of a synchronized network and a coordinated scheduler adjacent cells might use a by one subcarrier shifted allocation of data signals. In that case a significant inter cell interference reduction can be achieved as active subcarriers in one cell will see inactive ones in the other cell. For example, referring to FIG. 1 even subcarriers could be used in cell 110 and odd subcarriers in cell 114. This kind of staggered usage of subcarriers between two cells for interference mitigation may help to increase decoding capability.

The usage of every nth subcarrier and the use of different subcarriers in adjacent cells may involve signalling between the eNodeB*s and the UEs to keep all network elements aware of the carrier usage.

Figure 4:
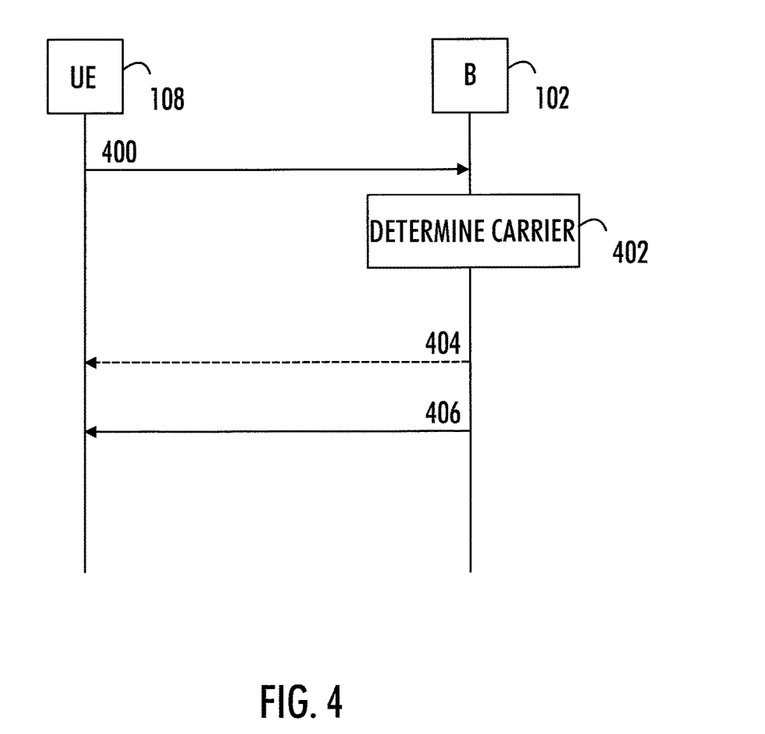
FIG. 4 is a signalling chart illustrating an embodiment.

FIG. 4 is a signalling chart illustrating an embodiment. The chart illustrates a simplified example of signalling between UE 108 and eNodeB 102.

The UE transmits 400 a packet to the eNodeB.

The eNodeB receives the packet. The scheduler of the eNodeB determines 402 the carrier having the first transmission starting time after the message arrival.

In an embodiment, information on the selected carrier is signalled 404 to the UE. The UE may receive a scheduling message comprising an indication of the subbands the response is transmitted on. This step is optional. The UE may be configured to monitor all carriers in which case explicit signalling is not required.

The eNodeB 102 transmits 406 a response to the UE on the selected carrier.

In an embodiment, low latency is being achieved without the need for a challenging new numerology regarding subframe length. Shortening the subframe length and OFDM symbol length would lead to a shorter guard interval with an according limitation to scenarios with very low delay spread or an exploding overhead for the guard interval. Both of these may now be avoided.

The proposed solution based on component carriers can benefit from low delay spread scenarios by adaptively reducing the guard interval length. Thereby the guard interval overhead—being currently in the order of 7%—can be reduced to e.g. 1%. Note, overall LTE Release 8 overhead is in the order of 40 to 50%. Therefore overhead reduction has become an important research topic and any option to achieve this is highly welcome.

Although the proposed solution offers several benefits the required changes or enhancements of the current systems are quite limited. In the proposed solution, the transmitting apparatus, such as an eNodeB scheduler, is configured to a fast rescheduling of user data to different component carriers. Suitable aligned and shifted symbol timing per component carriers is needed. UEs may be configured to follow the fast rescheduling to different component carriers or to listen to physical downlink control channel (PDCCH) of all component carriers simultaneously to find out when they will be scheduled in a certain component carrier. In an embodiment, an efficient signalling of the active component carrier is realized in which case simultaneous monitoring of component carriers is not required.

By using every second (or nth) subcarrier the power per used subcarrier can be increased. In the case of every second subcarrier the increase may be 3 dB. Another aspect might be the reference signal (RS) allocations, which means either a reallocation of RS signals, a muting of some of the reference signals or a limitation of 'short' OFDM symbols to those symbols carrying neither a PDCCH or a reference signal.

In an embodiment, if not all physical resource blocks (PRB) for all scheduled UEs on a short OFDM symbol are such time critical these can use still the full length of the FFT for decoding so that the signal power is fully exploited. In case a low delay UE fails on the first part of the signal decoding it can directly try to decode by combining the first with the second signal part. This can be seen as an ultra fast HARQ process, i.e. the first 'retransmission' is already available after just half a symbol length.

In an embodiment, full buffer or semi persistent data transmissions may be optimized by pre-allocation of scheduled data packets over time to the best fitting component carriers, i.e. a pre-information of the used component carrier per subframe and per UE. This reduces the signalling overhead and/or makes the overall system more robust.

Figure 5A:
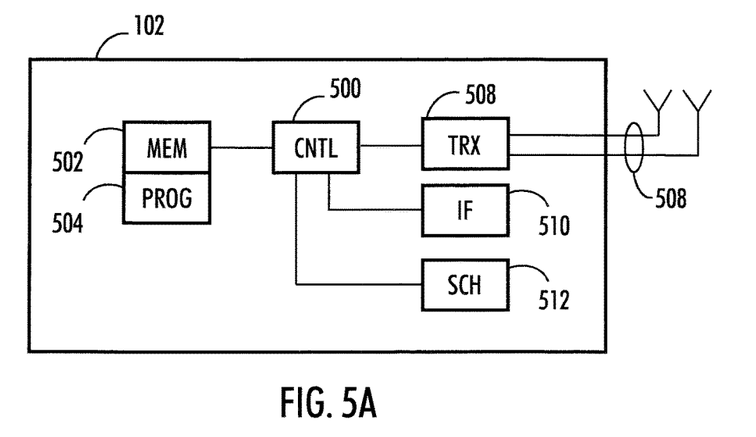
FIGS. 5A and 5B illustrate examples of apparatuses applying embodiments of the invention.

FIG. 5A illustrates a simplified example of a device in which some embodiments of the invention may be applied. In some embodiments, the device may be a network element such as a base station or an eNodeB of a communication system. The device may be a part or a section of a base station, an eNodeB.

Figure 5B:
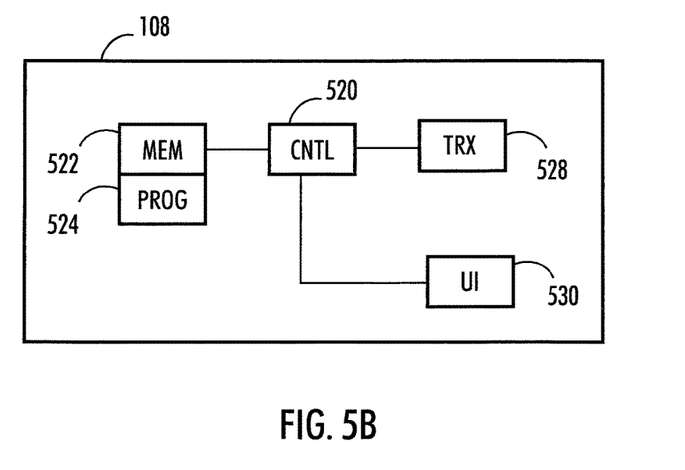

FIG. 5B shows an example of a block diagram of the structure of an apparatus according to an example embodiment. The apparatus of an example embodiment need not be the entire apparatus, but may be a component or group of components of the apparatus in other example embodiments. In some embodiments, the device may be user equipment UE or a respective device. The device may be a part or a section of user equipment.

In an embodiment, a communication system comprises one or more devices of FIG. 5A. In an embodiment, the communication system may comprise one or more devices of FIG. 5B. It should be understood that the apparatuses are depicted herein as examples illustrating some embodiments. It is apparent to a person skilled in the art that the devices may also comprise other functions and/or structures and not all described functions and structures are required. Although the devices have been depicted as single entities, different modules and memory may be implemented in one or more physical or logical entities. In addition, each device may be a part of another device.

FIG. 5A illustrates a simplified example of an apparatus such as a base station. The apparatus of the example includes one or more control circuitries or processing circuits (CNTL) 500 configured to control at least part of the operation of the apparatus.

The apparatus may comprise one or more memories (MEM) 502 for storing data. Furthermore the memory may store software (PROG) 504 executable by the control circuitry 500. The memory may be integrated in the control circuitry.

The apparatus may comprise a transceiver 506 which is configured to set up and maintain a wireless connection to user equipment within the service area of the apparatus. The transceiver 506 is operationally connected to the controller 500 and to an antenna arrangement 508. The antenna arrangement may comprise a set of antennas. The number of antennas may be two to four, for example. The number of antennas is not limited to any particular number.

The apparatus may be operationally connected to other network elements of the communication system. The network element may be an MME (Mobility Management Entity), an SAE GW (SAE Gateway), a radio network controller (RNC), another base station, a gateway, or a server, for example. The apparatus may be connected to more than one network element. The apparatus may comprise an interface 510 configured to set up and maintain connections with the network elements.

In an embodiment, the apparatus comprises a scheduler 512 configured to perform resource allocation operations described above. The scheduler may be operationally connected to the controller and the memory. The scheduler may be configured to control the apparatus to utilise a given number of parallel carriers in communication, where the transmission timing in each of the carriers is time-shifted by a predetermined time offset.

Referring to FIG. 5B, a simplified example of user equipment UE or a respective apparatus is disclosed. The apparatus of the example includes one or more control circuitries or processing circuits (CNTL) 520 configured to control at least part of the operation of the apparatus.

The apparatus may comprise one or more memories (MEM) 522 for storing data. Furthermore the memory may store software (PROG) 524 executable by the control circuitry 520. The memory may be integrated in the control circuitry.

The apparatus may comprise one or more transceivers (TRX) 528. The transceiver or transceivers are operationally connected to the control circuitry 520. It may be connected to an antenna arrangement (not shown). Instead of a transceiver, the apparatus may also comprise a connection to a transceiver.

The software 524 may comprise a computer program comprising program code means adapted to cause the control circuitry 520 of the apparatus to control a transceiver 528.

The apparatus may further comprise user interface (UI) 530 operationally connected to the control circuitry 520. The user interface may comprise a display which may be touch sensitive, a keyboard or keypad, a microphone and a speaker, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
   at least one processor; and
   at least one memory including computer program code, the at least one memory and the computer program code configured, with the at least one processor, to cause the apparatus to at least:
   utilize orthogonal frequency-division multiplexing (OFDM) in communication, wherein subbands are component carriers;
   utilize a given number of parallel subbands in the communication, where a transmission start timing in each of the subbands is time-shifted by a predetermined time offset compared to a neighboring subband, the predetermined time offset being a fifth of an orthogonal frequency-division multiplexing (OFDM) symbol length used in the communication; and
   use every even subband of the given number of parallel subbands for data transmission to produce a symmetric time domain signal.

2. The apparatus of claim 1, wherein the apparatus serves a cell in a cellular communication system, the apparatus being further configured to utilize different subband than the subband used in neighboring cells.

3. The apparatus of claim 1, wherein the at least one memory and the computer code are further configured, with the at least one processor, to cause the apparatus to at least:
   transmit information about the parallel subbands and the time-shifts of the subbands.

4. The apparatus of claim 1, wherein the at least one memory and the computer code are further configured, with the at least one processor, to cause the apparatus to at least:
   receive a message,
   transmit a response to the message utilizing the sub band having an earliest transmission start time after the arrival of the message.

5. An apparatus, comprising:
   at least one processor; and
   at least one memory including computer program code, the at least one memory and the computer program code configured, with the at least one processor, to cause the apparatus to at least:
   transmit a message to a base station of a communication system;
   utilize orthogonal frequency-division multiplexing (OFDM) to receive a response to the message on one of a given number of parallel subbands, where a transmission start timing in each of the subbands is time-shifted by a predetermined time offset compared to a neighboring subband, wherein the predetermined time offset is a fifth of an orthogonal frequency-division multiplexing (OFDM) symbol length; and
   use every even subband of the given number of parallel subbands for data transmission to produce a symmetric time domain signal.

6. The apparatus of claim 5, wherein the at least one memory and the computer code are further configured, with the at least one processor, to cause the apparatus to at least:
   receive information about the parallel subbands and the time-shifts of the subbands.

7. The apparatus of claim 5, wherein the at least one memory and the computer code are further configured, with the at least one processor, to cause the apparatus to at least:
   receive a scheduling message comprising an indication of the sub band the response is transmitted on.

8. The apparatus of claim 5, wherein the at least one memory and the computer code are further configured, with the at least one processor, to cause the apparatus to at least:
   monitor the given number of parallel subbands to detect the response.

9. The apparatus of claim 5, wherein the at least one memory and the computer code are further configured, with the at least one processor, to cause the apparatus to at least:
   receive the response only on every $n^{th}$ OFDM subband, where n is an even positive integer; the response being transmitted in an OFDM symbol, and at least one of:

start demodulating and decoding the response after receiving half of the symbol length of the OFDM symbol when n equals two; and start demodulating and decoding the response after receiving a quarter of the symbol length of the OFDM symbol when n equals four.

10. A method, comprising:

utilizing orthogonal frequency-division multiplexing (OFDM) in communication, wherein subbands are component carriers;

utilizing a given number of parallel subbands in the communication, where a transmission start timing in each of the subbands is time-shifted by a predetermined time offset compared to a neighboring subband, the predetermined time offset being a fifth of an orthogonal frequency-division multiplexing (OFDM) symbol length used in the communication; and using every even subband of the given number of parallel subbands for data transmission to produce a symmetric time domain signal.

11. The method of claim 10, further comprising:

transmitting information about the parallel subbands and the time-shifts of the subbands.

12. A method, comprising:

transmitting a message to a base station of a communication system;

utilizing orthogonal frequency-division, multiplexing (OFDM) in receiving a response to the message on one of a given number of parallel subbands, where a transmission start timing in each of the subbands is time-shifted by a predetermined time offset compared to a neighboring subband, the predetermined time offset being a fifth of an orthogonal frequency-division multiplexing (OFDM) symbol length used in the communication; and using every even subband of the given number of parallel subbands for data transmission to produce a symmetric time domain signal.

13. The method of claim 12, further comprising:

receiving information about the parallel subbands and the time-shifts of the subbands.

14. The method of claim 12, further comprising:

receiving a scheduling message comprising an indication of the subbands the response is transmitted on.

* * * * *